US012563012B2

(12) United States Patent
Burugu et al.

(10) Patent No.: US 12,563,012 B2
(45) Date of Patent: Feb. 24, 2026

(54) MANAGING WEBTOP RESOURCE HOSTNAME RESOLUTION

(71) Applicant: F5, Inc., Seattle, WA (US)

(72) Inventors: Vijay Kumar Burugu, Seattle, WA (US); Rakesh Adhi, Seattle, WA (US)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 18/710,153

(22) PCT Filed: Jan. 31, 2023

(86) PCT No.: PCT/US2023/011944
§ 371 (c)(1),
(2) Date: May 14, 2024

(87) PCT Pub. No.: WO2023/150097
PCT Pub. Date: Aug. 10, 2023

(65) Prior Publication Data
US 2025/0023842 A1       Jan. 16, 2025

(30) Foreign Application Priority Data
Feb. 1, 2022    (IN) ............................. 202241005475

(51) Int. Cl.
*G06F 13/00* (2006.01)
*H04L 61/4511* (2022.01)
*H04L 61/58* (2022.01)

(52) U.S. Cl.
CPC .......... *H04L 61/4511* (2022.05); *H04L 61/58* (2022.05)

(58) Field of Classification Search
CPC ....... H04L 61/4511; H04L 61/58; H04L 41/22
(Continued)

(56) References Cited

U.S. PATENT DOCUMENTS

| | | | |
|---|---|---|---|
| 7,987,269 | B1 | 7/2011 | Mayhead |
| 8,214,887 | B2 | 7/2012 | Clark |

(Continued)

FOREIGN PATENT DOCUMENTS

| | | |
|---|---|---|
| CN | 113760383 A | 12/2021 |
| WO | 2010043722 A1 | 4/2010 |

OTHER PUBLICATIONS

International Search Report dated Apr. 26, 2023 issued in International Application No. PCT/US23/11944.
(Continued)

*Primary Examiner* — Kenneth R Coulter
(74) *Attorney, Agent, or Firm* — Troutman Pepper Locke LLP

(57) ABSTRACT

Technology related to resolution of hostname for webtop resource access is disclosed. In one example, a method includes receiving request for accessing one or more resources from the webtop associated with the user. A usage pattern data of the user for the webtop is determined. For the requested resource, hostname pre-resolution data is determined based on the usage pattern data and an access policy before a given resource is requested for access. A response for the resource access request is generated based on the determined hostname pre-resolution data and the access policy. The response for the resource access request comprises an address of at least one corresponding backend server for redirecting the user to access the requested resource.

20 Claims, 8 Drawing Sheets

(58) Field of Classification Search

USPC ................................. 709/245, 224, 223, 229

See application file for complete search history.

(56) References Cited

U.S. PATENT DOCUMENTS

| | | | |
|---|---|---|---|
| 8,943,548 B2 | 1/2015 | Drokov | |
| 8,996,857 B1 | 3/2015 | Akella | |
| 9,225,794 B2 * | 12/2015 | Roskind | G06F 16/95 |
| 9,985,786 B1 | 5/2018 | Bhabbur | |
| 10,169,937 B1 | 1/2019 | Zwink | |
| 10,382,426 B2 | 8/2019 | Falodiya | |
| 10,803,164 B2 | 10/2020 | McClintock | |
| 10,972,453 B1 | 4/2021 | Natarajan | |
| 2001/0034771 A1 | 10/2001 | Hütsch et al. | |
| 2003/0115461 A1 | 6/2003 | O'Neill | |
| 2003/0163733 A1 | 8/2003 | Barriga-Caceres | |
| 2005/0216421 A1 | 9/2005 | Barry et al. | |
| 2006/0021016 A1 | 1/2006 | Birk | |
| 2006/0031407 A1 | 2/2006 | Dispensa et al. | |
| 2007/0249288 A1 | 10/2007 | Moallemi | |
| 2008/0021997 A1 | 1/2008 | Hinton | |
| 2011/0004117 A1 | 1/2011 | Neville | |
| 2014/0162685 A1 | 6/2014 | Edge | |
| 2014/0337954 A1 | 11/2014 | Ahmed | |
| 2015/0082427 A1 | 3/2015 | Ivanchykhin | |
| 2015/0149767 A1 | 5/2015 | Oualha | |
| 2015/0195243 A1 * | 7/2015 | Roskind | H04L 61/4511 709/213 |
| 2016/0021097 A1 | 1/2016 | Shrotri | |
| 2016/0057140 A1 | 2/2016 | Heeter | |
| 2017/0346815 A1 | 11/2017 | Andrews | |
| 2018/0091484 A1 | 3/2018 | Atta et al. | |
| 2018/0167378 A1 | 6/2018 | Kostyukov | |
| 2018/0219762 A1 | 8/2018 | Wang | |
| 2018/0219854 A1 | 8/2018 | Miran | |
| 2019/0036934 A1 | 1/2019 | Pitchaimani | |
| 2019/0238554 A1 | 8/2019 | Disraeli | |
| 2020/0034521 A1 | 1/2020 | Teng | |
| 2020/0092181 A1 | 3/2020 | Thiagarajan | |
| 2020/0137048 A1 | 4/2020 | Doner | |
| 2021/0389941 A1 | 12/2021 | Delville | |
| 2022/0103370 A1 | 3/2022 | Alwen | |

OTHER PUBLICATIONS

International Preliminary Report on Patentability for PCT/US2023/011944, dated Aug. 15, 2024.

International Application No. PCT/US2023/033487. International Search Report and the Written Opinion of the International Searching Authority dated Jan. 5, 2024.

European Search Report for corresponding European Application Serial No. 20156087.7, dated Mar. 27, 2020.

F5 Networks Inc., "Big-IP® Access Policy Manager® _Secure Web Gateway", manual, Aug. 16, 2018, 150 pages, Version 13.1, F5 Networks, Inc.

F5 Networks Inc., "Big-IP® Access Policy Manager® Customization", Nov. 15, 2017, 106 pages, Version 13.1, F5 Networks, Inc.

F5 Networks Inc., "Big-IP® Access Policy Manager® Implementations", manual, Nov. 15, 2017, 136 pages, Version 13.1, F5 Networks, Inc.

F5 Networks Inc., "Big-IP® Access Policy Manager® Network Access", manual, Apr. 23, 2018, 104 pages, Version 13.1, F5 Networks, Inc.

F5 Networks Inc., "Big-IP® Access Policy Manager® Portal Access", manual, Nov. 15, 2017, 80 pages, Version 13.1, F5 Networks, Inc.

F5 Networks Inc., "Big-IP® Access Policy Manager®: Application Access", manual, Nov. 15, 2017, 56 pages, Version 13.1, F5 Networks, Inc.

F5 Networks Inc., Big-IP® Access Policy Manager® Authentication and Single Sign-On, manual, Oct. 22, 2018, 394 pages, Version 13.1, F5 Networks, Inc.

Microsoft, What are authentication methods, available at: https://docs.microsoft.com/en-us/azure/active-directory/authentication/concept-authentication-passwordless; Aug. 4, 2019.

Microsoft, What is passwordless, available at: https//docs.microsoft.com/en-us/azure/active-directory/authentication/concept-authentication-passwordless; Aug. 15, 2019.

Wang et al., "SoundAuth: Secure Zero-Effort Two-Factor Authentication Based on Audio Signals", Jun. 2018, 9 pages (Year: 2018).

* cited by examiner

MANAGING WEBTOP RESOURCE HOSTNAME RESOLUTION

CROSS REFERENCE TO RELATED APPLICATION

This application is a national phase filing under 35 U.S.C. § 371 of International Patent Application No. PCT/US2023/011944, filed on 31 Jan. 2023, which claims the benefit of Indian Patent Application Number 202241005475, filed 1 Feb. 2022, the entirety of each is incorporated by reference as if set forth in full below.

FIELD

This technology generally relates to enterprise applications, and more specifically to managing name server data resolution, such as Domain Name System (DNS) resolution for enterprise applications.

BACKGROUND

A webtop is a network environment that is enabled with desktop capabilities. A webtop can provide multiple resources which users can access via a browser. For example, the network environment can be an enterprise network, and the user may access the enterprise network by receiving a desktop environment embedded in a browser window or by a client application executed by their client devices. The applications associated with the enterprise network can include the resources which the user, such as an employee of the enterprise, may access through the webtop.

Access to these resources can be regulated by intermediary services and/or devices, such as an access policy manager (APM). For example, the APM can be used to maintain a repository of access policies which may be evaluated every time the user attempts to login to the webtop to access one or more resources. The intermediary services of the webtop can increase accessibility and security for the resources of the network, but also add latency and indeterminate response times when the user attempts to access resources through the webtop. Accordingly, there can be many challenges in implementing a high-performance, highly available, and secure webtop system.

BRIEF SUMMARY

Generally, a system of one or more computers can be configured to perform operations or actions by virtue of having software, firmware, hardware, or a combination of them installed on the system that in operation causes or cause the system to perform the actions as illustrated and described by way of the examples herein. One or more computer programs can be configured to perform operations or actions by virtue of including instructions that, when executed by data processing apparatus, cause the apparatus to perform the actions as illustrated and described by way of the examples herein. One example includes a method implemented in cooperation with a network traffic management system including one or more network traffic management modules, networking modules, or server modules, the method including: receiving a request for accessing a webtop associated with a user. The webtop providing an interface for the user to access a plurality of resources. The method also includes determining usage pattern data of the user for the webtop, wherein the usage pattern data comprises resource access pattern data for the plurality of resources accessible from the webtop. The method also includes determining hostname pre-resolution data for a given resource from the plurality of resources accessible from the webtop before the given resource is requested for access by the user, based on the usage pattern data and an access policy. The method also includes generating a response for a resource access request based on the determined hostname pre-resolution data and the access policy, wherein the response for the resource access request comprises an address of at least one corresponding server for redirecting the user to access the given resource requested for access.

Other examples incorporating this example include corresponding computer systems, apparatus, and computer programs recorded on one or more non-transitory computer readable media (e.g., computer storage devices), each configured to perform the actions of the methods as illustrated and described by way of the examples herein. An example computer system includes one or more network traffic management modules, networking modules, or server modules, memory comprising programmed instructions stored thereon, and one or more processors configured to be capable of executing the stored programmed instructions to perform the actions of the methods as illustrated and described by way of the examples herein. An example non-transitory computer readable medium having stored thereon instructions for managing name server data resolution, the instructions comprising executable code that, when executed by one or more processors, causes the processors to perform the actions of the methods as illustrated and described by way of the examples herein. An example network traffic management apparatus
includes memory comprising programmed instructions stored thereon and one or more processors configured to be capable of executing the stored programmed
instructions to perform the actions of the methods as illustrated and described by way of the examples herein.

DETAILED DESCRIPTION

Figure 1:
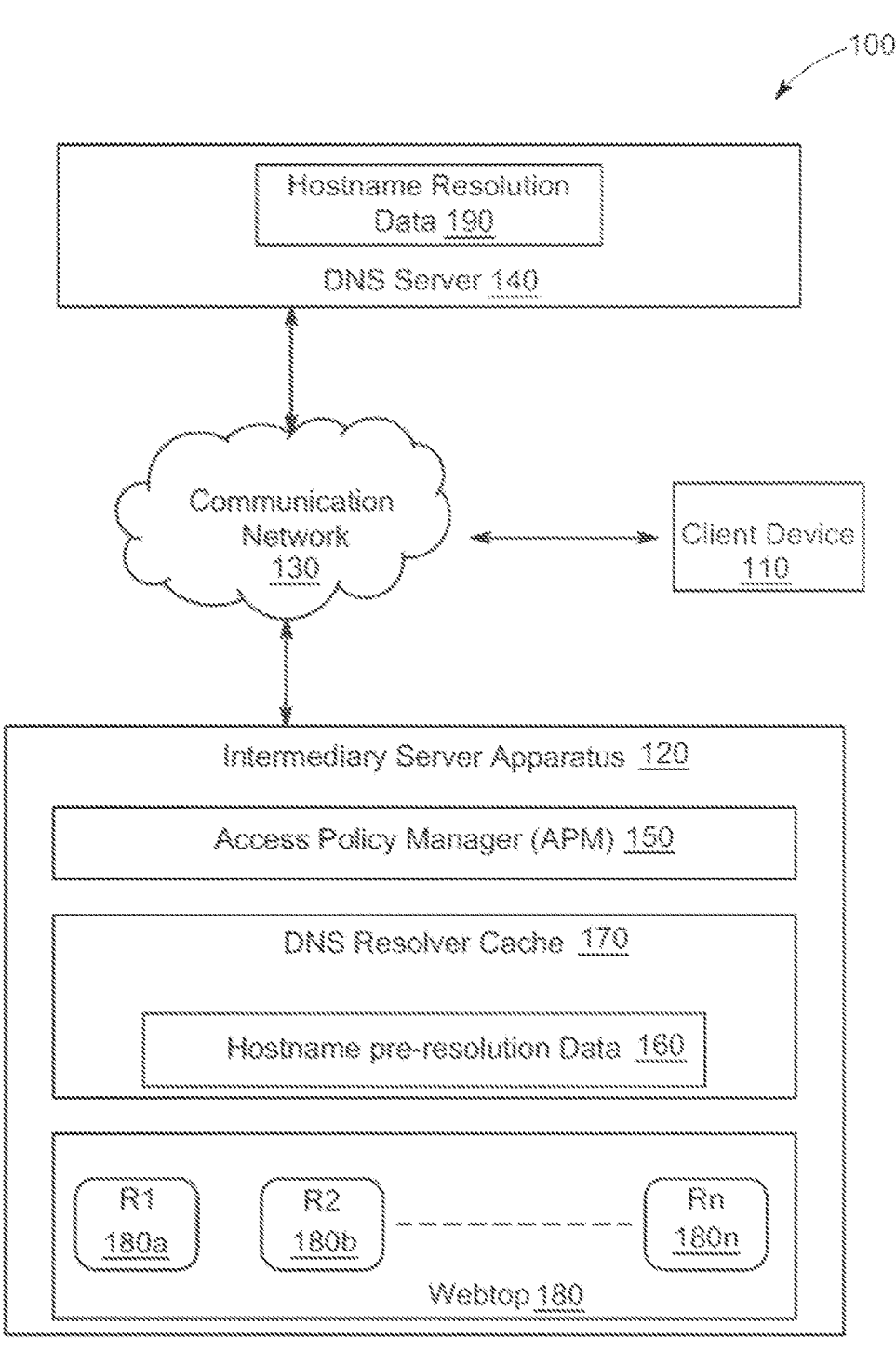
FIG. 1 is a block diagram of an example architecture including an intermediary server computer including an access policy manager and a hostname pre-resolution logic, such as for servicing name server requests from a webtop.

In an enterprise network, a webtop is an application or an application landing page through which enterprise resources are made available to users. The webtop comprises a desktop environment embedded in a web browser or the application running on a client device, like the one an employee may access when they are physically in an enterprise office. Thus, using the webtop, the user can access the enterprise network and the resources available thereon, from any location without being physically present at the enterprise office. Safeguards can be implemented to provide a high-level of security and access authentication, to enable enterprise data security, confidentiality and prevent unauthorized access. The safeguards can be managed by defining access polices for webtop access by each user and can be performed by a specialized module and/or apparatus known as an access policy manager (APM). The APM manages configuration of access policies corresponding to each user associated with their configured webtop.

As one example, the webtop may be configured to be of three types: a network access webtop, a portal access webtop, and a full webtop. The network access webtop provides a landing page for an access policy branch to which a network resource is assigned. The portal access webtop provides a landing page for an access policy branch to which portal access resources are assigned. The full webtop provides an access policy ending for a branch to which multiple resources can be assigned, such as portal access resources, application tunnels, remote desktops, and webtop links, in addition to a network access tunnel. The access policy associated with any webtop configuration defines a set of rules governing acceptable methods of connecting to an internal network, such as the enterprise network. The set of rules comprise rules for defining criteria for granting access to various servers, applications, and other resources on the network.

The resources on the network are associated with hostnames of backend hosts. The backend hosts or servers carry out execution of various processing tasks assigned to the resource. In one solution, when a user logs into their webtop and clicks on an icon corresponding to a given resource, a hostname resolution process begins. The hostname resolution process can include resolving the hostname and identifying an address of a backend server to which the user request can be redirected to grant access to the resource. This process may take anywhere between few milliseconds to few seconds. Sometimes, the time taken in resolution of the hostname is high, due to high network latency or high network load, resulting in delays in reaching a primary and/or secondary Domain Name System (DNS) server, which is responsible for resolving the hostname and providing the address of the corresponding backend server. This can lead to an increase in user response time and a decrease in predictability, which reduces the overall performance of a system involving webtop access. For example, a speed of a DNS server responsible for carrying out the hostname resolution process can vary based on a variety of factors. The DNS server maintains a DNS cache, which is a faster access memory for storing and quickly looking up the backend server name or redirection path corresponding to any hostname. If, for the hostname of interest, an entry is not found in the DNS cache, then the hostname resolution process can take a longer time to execute, which is governed by factors such as network delays in reaching the DNS server, overall load on the DNS server, and the like. The delay in the hostname resolution process can decrease the overall user experience and the predictability, performance, availability, and efficiency of the overall webtop system.

As described herein, the predictability and performance of a webtop system can potentially be increased. In one example, a method can include receiving a request for accessing a webtop associated with a user. The webtop provides an interface for the user to access a plurality of resources. Usage pattern data of the user for the webtop can be determined. The usage pattern data of the user can be determined by monitoring the activity of the user (such as based on permissions set by an administrator user for allowing monitoring of the activity of the user). The usage pattern data includes resource access pattern data for each of the plurality of resources accessible from the webtop. Based on the usage pattern data and an access policy associated with a given resource of interest, hostname pre-resolution data can be determined for the given resource from the plurality of resources accessible from the webtop before the given resource is requested for access by the user. The given resource may be a resource which is favorite resource of the user, as determined based on their usage pattern data for the given resource, and as also defined in the access policy for the given resource. A response to the resource access request can be generated based on the determined hostname pre-resolution data and the access policy, where the response to the resource access request can include an address of at least one corresponding server (such as a relevant backend server) for redirecting the user to access the given resource requested for access. The response to the resource access request can be generated by redirecting the user to the DNS cache, where a look-up of the hostname associated with the given resource is performed in the hostname pre-resolution data stored in the form of multiple entries in the DNS cache. Based on the look-up, an address for at least one server which can provide the services requested by the given resource is determined.

An intermediary server computer can perform various proxy and other services by processing packets that transit the intermediary server computer. For example, the intermediary server computer can perform webtop resource access request management, access policy configuration and/or assignment, load balancing, rate monitoring, caching, encryption/decryption, session management (including key generation), address translation, denial-of-service (DoS) protection, and/or access control, for example. An intermediary server computer can act as a proxy for an application server, such as an application server serving the webtop and its associated landing pages to the users. A proxy is an agent that is situated in a path of communication between a client and a server (e.g., an application server) that can intercept communications (e.g., network packets, frames, datagrams, and messages) between the client and the server. Additionally, functions performed by the application server computer and/or the client device can be offloaded to the intermediary server computer.

Name server protocols, such as the DNS protocol, can be used to facilitate a name server service. Generally, a network service is a component of a distributed application that is accessible over a network and is accessed using an application layer (L7) protocol. For example, a network service can be implemented in a client-server or peer-to-peer architecture and can provide computational and/or storage functionality in response to requests to the service. A name server service can be used to manage a namespace and to map names within the namespace to associated information. For example, a DNS service can be used to map a website name, or a hostname associated with a webtop resource (e.g., website.example.com) to a network address of a website server or the backend server (e.g., 192.0.2.20) that hosts the website or the webtop resource. For example, a DNS client can send a DNS request, requesting an address of the website, to a DNS server. The DNS server can respond to the DNS client by returning both the name of the website and the address of the website. An intermediary server can be interposed between the DNS client and the DNS server so that the client requests are intercepted by the intermediary server. The intermediary server computer can potentially speed up DNS by caching DNS responses from the DNS server and using the cached values to respond directly to the DNS clients rather than forwarding DNS requests to the DNS server. Specifically, the caching of the DNS information can be performed by a DNS recursive resolver of the intermediary server computer, where the DNS recursive resolver can issue DNS service requests (DNS queries) on behalf of DNS clients and cache the responses. The responses can be cached in a DNS cache, also known as a DNS resolver cache, configured in the intermediary server, which can be used to pre-resolve the hostname resolution requests for webtop resources.

The DNS protocol is architected to execute on a dynamic hierarchical computing system. For example, a DNS recursive resolver can initiate a recursive query on behalf of a client issuing a DNS request. The recursive query can be sent to a first DNS server which can respond to query using cached and/or authoritative information stored at the first DNS server, and/or the recursive query can be forwarded to one or more other DNS servers to retrieve the information. An authoritative DNS server is a server that holds the primary authoritative record for a given DNS record. For example, an administrator of a website can designate a DNS server to store the primary record that maps the website name to a website address. The authoritative DNS server and/or the website address can change over time due to a variety of factors, such as hardware failures, software errors, power failures, network outages, the addition of hardware capacity, and so forth. To circumvent this problem, periodic health status monitoring of the authoritative DNS server may be performed. Also, additional DNS severs may also be identified and secondary backend serves may also be identified to increase the availability of the overall system of webtop in case the authoritative DNS server or primary backend servers fail.

Example Architectures for Managing Name Server Data

FIG. 1 is a block diagram of an example architecture 100 of a network traffic management system including one or more network traffic management apparatuses, which are referred to as an intermediary server computer (or apparatus) 120 throughout this disclosure. The network traffic management system architecture 100 also comprises a client device 110 and one or more server devices such as a DNS server 140, all coupled communicatively via a communication network 130. Specifically, FIG. 1 illustrates how network traffic between the client device 110 and the DNS server 140 computer can be forwarded to the intermediary server computer 120 and how name server protocol packets generated by a webtop 180 comprising a plurality of resources 180*a*, 180*b* . . . 180*n*, can be processed by the intermediary server computer 120 using hostname pre-resolution data 160 and an access policy manager 150. Further, the intermediary server computer 120 comprises a DNS resolver cache 170 (also referred to as DNS cache interchangeably hereinafter) which parses addresses of plurality of servers associated with one or more hostnames associated with corresponding given resource from the plurality of resources 180*a*, 180*b* . . . 180*n*. The architecture 100 can be implemented using a client-server architecture as described in more detail with reference to FIG. 7, where the different components (110, 120, 130, 140) of the client-server architecture can be implemented using a computing environment as described in more detail with reference to FIG. 8.

The client device 110 and the DNS server 140 can communicate via the communication network(s) 130 and the intermediary server computer 120. Specifically, requests from the client device 110 can be forwarded through the intermediary server computer 120 to the DNS server 140 using the communication network(s) 130. The client device 110 can be connected to the intermediary server computer 120 using a public and/or private network, such as the communication network(s) 130.

As one example, the intermediary server computer 120 can act as a gateway for the client device 110 to reach public networks, such as the Internet. For example, the intermediary server computer 120 can be managed by an Internet service provider or other provider that connects clients (e.g., the client device 110) to public networks. The client device 110 can send requests for accessing a resource from the plurality of resources 180*a*, 180*b* . . . 180*n* from the webtop 180 by first requesting for access of the webtop 180 and sending the request for accessing the webtop 180 to the intermediary server computer 120. Each resource is associated with a hostname. Each hostname is associated with an address of a corresponding server (also interchangeable referred to hereinafter as a backend server) which can serve the resource access request for a given resource. The resource access request is a DNS request for accessing the resource, such as a DNS query that is directed to the DNS resolver cache 170 for resolution.

The intermediary server computer 120 comprises the DNS resolver cache 170 which contains hostname pre-resolution data 160. The hostname pre-resolution data 160 comprises a table which is populated with one or more entries. The one or more entries comprise different types of records, such as messages, resource records, and the nameservers that the intermediary server computer 120 queries to resolve DNS queries. The resource records in turn may comprise a hostname associated with each resource, and further the nameservers comprise the one or addresses associated with one or more backend servers that can service the resource access request for the given resource that was requested for access. The one or more entries also comprise one or more addresses associated with one or more corresponding backend servers for redirecting a user of the webtop 180.

As described in more detail below, the client device 110 can send requests for accessing resources (e.g., DNS requests) to the DNS server 140 via the intermediary server computer 120. But the intermediary server computer 120 can check one or more access policies stored in the access policy manager 150 to determine if the resource is associated with an access policy that enables serving of the request for accessing the resource using the hostname pre-resolution data 160 stored in the DNS resolver cache 170. If yes, a resource access request is generated to serve the request from the DNS resolver cache 170, without the need to redirect the user to the DNS server 140. The DNS server 140 also comprises hostname resolution data 190, which is prefetched and stored in the DNS resolver cache 170, based on a usage pattern data associated with the user and the access policy configured for the given requested resource. In this manner, the architecture 100 enables provision of quick response to the client device 110, for resource access requests generated by the user associated with the webtop 180 and the client device 110.

As an example, as soon as the user logs into the webtop 180, the intermediary server apparatus 120 initiates a look-up of hostnames associated with the plurality of resources 180a, 180b . . . 180n associated with the webtop 180. The look-up request is sent to the DNS server 140, which comprises the hostname resolution data 190 for the host-names associated with the plurality of resources 180a, 180b . . . 180n. The hostname resolution data 190 corresponding to the plurality of resources 180a, 180b . . . 180n is retrieved from the DNS server 140 and stored as entries in the DNS resolver cache 170, in the form of hostname pre-resolution data 160. It may be noted that the hostname pre-resolution data 160 is stored in the DNS resolver cache 170 even before the user initiates a request for accessing a resource from the webtop 180. Now, when the user initiates the request for accessing the resource, such as by clicking on the resource on the webtop 180, a response to the resource access request is generated based on the hostname pre-resolution data 160 already stored in the DNS resolver cache 170. The hostname pre-resolution data 160 includes the address of the server which can provide the services of given resource. So, the response to the resource access request includes the address of this server, and using it, the user is redirected to the server, and services of the given resource are then accessed. Thus, this decreases the overall response time for serving the resource access request for the given resource and reduces the load on the webtop 180. This is because in the absence of the hostname pre-resolution data 160, when user accesses the webtop 180 and clicks on a given resource from the plurality of resources 180a, 180b . . . , 180n, and the webtop 180 is waiting for hostname resolution for the given resource, the entire process or thread associated with webtop 180 execution service is blocked until the resolution is complete. Further, if the DNS server 140 is very slow or if the user clicks on many resources, the webtop 180 execution service will be fully busy in resolving hostnames by con-suming lots of Operating System (OS) resources. However, this problem can be overcome by the architecture 100 and various operations for managing resource access requests based on hostname pre-resolution data 160 stored in the DNS resolver cache 170 described above.

The DNS resolver cache 170 can be used to allow the intermediary server computer 120 to respond to repeated DNS queries more quickly. The DNS resolver cache 170 can be used to cache DNS responses, such as from the DNS server 140, and answer queries for hostname resolution from the DNS resolver cache 170. Thus, the intermediary server computer 120 can immediately respond to subsequent client requests for the same resource. This enhances DNS perfor-mance in two significant ways. First, answering a DNS query from the DNS resolver cache 170 is faster and has a very short latency, because the sooner a client gets a DNS response, the faster the client can access the Internet resource. Second, caching DNS responses reduces the num-ber of queries that must be resolved. The intermediary server computer 120 uses the DNS resolver cache 170 to resolve the same query from multiple clients handling many more queries per second than a typical DNS resolver, such as the DNS server 140.

It may be noted that the DNS resolver cache 170 is a type of DNS cache that stores hostname pre-resolution data 160. However, the DNS resolver cache 170 may also inter-changeably be referred as DNS cache, without deviating from the scope of the present disclosure.

The hostname pre-resolution data 160 is pre-fetched and stored in the DNS resolver cache 170 based on the usage pattern data of the user for the given resource, and the access policy associated with each of the resources attached to/con-figured on the webtop 180. As an example, the access policy manager 150 stores the access policies for each of the resources such as the resource 180a, the resource 180b and the resource 180n configured on the webtop 180. The access policy for each resource comprises a set of rules that are configured to identify a resource type for each of the resources 180a, 180b . . . 180n. The resource type may be at least a favorite resource or a non-favorite resource. The resource type is determined based on usage pattern data associated with the resource. For example, based on usage pattern data of the resource 180a, it may be determined that the user always accesses this resource when they are logged onto the webtop 180. Thus, the resource 180a may be determined to be a favorite resource. When the resource type is favorite resource, the hostname pre-resolution data 160 may be fetched for the resource and corresponding one or more entries for the hostname associated with the resource may be stored in the DNS resolver cache 170. The entire process of accessing the webtop 180 and requesting for a given resource may be initiated through the user's client device 110.

The client device 110 can be a computing device capable of sending network traffic over a communications network (e.g., network 130). For example, the client device 110 can be a mobile computing device, a desktop computing device, a laptop computing device, a tablet computing device, a virtual machine executing on a cloud-based computing environment, and so forth. The client device 110 can execute an agent (e.g., a browser or other software application) that requests a service provided by an application server or by the DNS server 140. The agent can make sub-requests to other services (such as requests to the DNS server 140) that may be transparent to the user of the client device 110. For example, the agent can generate requests that are transmitted by the client device 110 using a connectionless communi-cation protocol (e.g., user datagram protocol (UDP)) or a connection-oriented communication protocol (e.g., trans-mission control protocol (TCP)).

Each of the server computers, such as the DNS server 140 can be computing devices capable of sending network traffic over a communications network (e.g., network 130) and processing requests by client devices (such as the client device 110). The server computer 140 can include multiple hardware and/or software server resources (not shown), a virtual machine executing on a cloud-based computing environment, and so forth. The server computer 140 can execute a DNS server software application which can respond to DNS client requests and retrieve information from a DNS database (not shown). For example, the DNS data can include a mapping of a service executing on an application server (not shown), or a backend sever computer to a network address of the application server compute. The application server computer can execute a server software application, such as an HTTP server application or a secure shell (SSH) server application, for example. Additionally, the application server computer can execute a non-DNS agent. For example, the non-DNS agent can be a TLS or SMTP server software application. The application server computer can include a digital certificate (also referred to as a public-key certificate). The digital certificate can be used by the non-DNS agent to verify that the non-DNS agent is the source of communications from the agent. For example, a receiver (e.g., the intermediary 120 or the client 110) of the communications can authenticate the digital certificate using cryptographic techniques. Authentication is the process of verifying that an identity of an entity is genuine.

Generally, cryptography is the study of secure communications. Encryption is the reversible transformation of clear or unencrypted information (e.g., text, plaintext, or data) into data that is computationally infeasible to understand except for the sender or the intended recipient of the information. Decryption is the reversal of the encryption process, where encrypted information is transformed into unencrypted information. Encryption and decryption are performed using one or more cryptographic algorithms that can include one or more cryptographic operations. Cryptographic operations can include encoding information using a cryptographic key, decoding information using a cryptographic key, and generating a cryptographic key. Cryptographic keys are values (e.g., 128- or 256-bit numbers) that are selected based on their cryptographic properties. Cryptographic keys can be symmetric keys or asymmetric keys. When a symmetric key is used to encrypt information, the same symmetric key can be used to decrypt the information. Asymmetric keys come in groups (e.g., a public/private key pair). The group can include a private key and one or more public keys. Information that is encrypted with the private key can be decrypted with the corresponding public key(s). Information that is encrypted with one of the public keys(s) can be decrypted with the corresponding private key. In order to keep encrypted information confidential, symmetric keys and private keys are safeguarded using various techniques. Encryption of communications can be used to increase security of a client-server architecture, such as the architecture 100 including the intermediary server computer 120.

Figure 2:
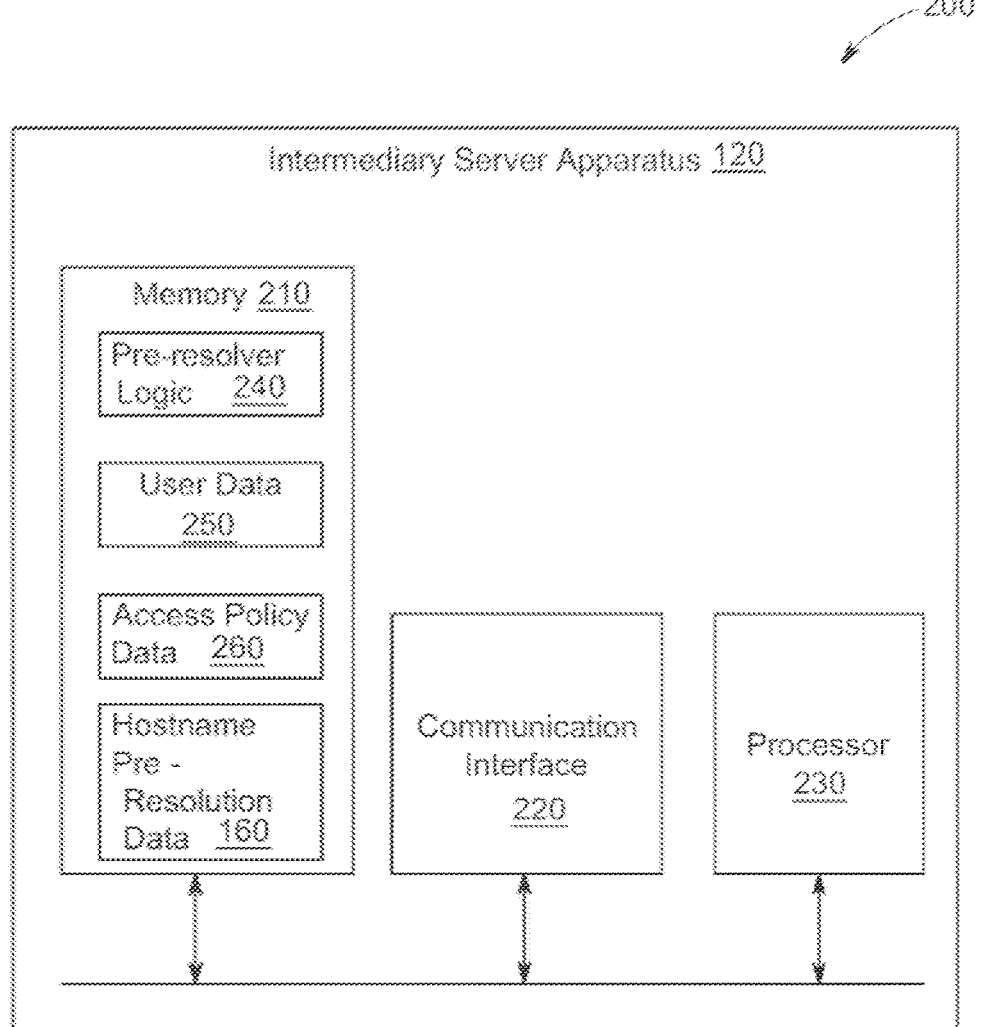
FIG. 2 is a block diagram of the example network traffic management apparatus for managing resource access requests from the webtop.

FIG. 2 is a block diagram 200 of the example intermediary server apparatus 120 (also interchangeably referred to as intermediary server computer) for managing resource access requests from the webtop 180. The intermediary server apparatus 120 can include memory 210, one or more communication interface(s) 220, and one or more processor(s) 230. The processor 230, communication interface 220, and the memory 210 can be coupled together with an interconnect, such as a bus for passing information, so that the components of the intermediary server apparatus 120 can communicate with each other using the interconnect. The communication interface 220 can be used to send and receive communications (e.g., network packets) with other computing devices, such as a client, an application server, and a DNS server. The processor 230 can be used to execute computer-executable instructions that are stored in the memory 210 and/or storage resources (not shown). The computer-executable instructions can be organized into software routines (also referred to as modules or components) comprising executable code to perform various computing tasks. It should be noted that while FIG. 2 illustrates one organization of routines, other organizations are possible. For example, the illustrated routines can be sub-divided into smaller routines and/or combined into larger routines. The memory 210 can also include structured and/or unstructured data that is used by the software routines to perform the computing tasks.

The memory 210 can also include an operating system (OS) kernel (not shown) which can include different software routines for managing different aspects of the execution of programs and for interfacing with the hardware of the intermediary server apparatus 120. For example, the OS kernel can manage the loading and removal of software applications and other routines into the memory 210 of the intermediary server apparatus 120; the OS kernel can manage storage resources of the intermediary server apparatus 120; the OS kernel can manage processes and/or threads executing on the processor 230; the OS kernel can manage power states of the intermediary server apparatus 120; the OS kernel can provide an interface for applications and other routines to send and receive communications (e.g., network packets) using the communications interface 220; and the OS kernel can enable inter-process communication between different routines executing on the intermediary server apparatus 120.

The memory 210 can include various modules and sub-modules such as a pre-resolver logic 240, user data 250, access policy data 260, and hostname pre-resolution data 160. The pre-resolver logic 240 can include different software routines for managing resource access requests from the webtop 180, based on pre-resolving or pre-resolution of hostname associated with the resource. The pre-resolver logic 240 comprises operations related to checking of one or more access policies associated with the resource, configuring an access policy for the resource, determining a resource type for a resource, monitoring user activity data, analyzing usage pattern data for a resource, monitoring health status data for backend serves, for example. Some of these operations will be described in detail, in conjunction with methods 500 and 600 described in FIG. 5 and FIG. 6, respectively.

The pre-resolver logic 240 can include computer hardware, software, or a combination thereof. As one example, the pre-resolver logic 240 can include a hardware co-processor that is tuned for performing operations of hostname pre-resolution based on resource access requests as disclosed herein. For example, the co-processor can include computer hardware circuitry that is configured to parse the request for accessing a resource (from the webtop 180), determine hostname pre-resolution data 160 and access policy data 260 associated with the resource, generating a resource access response for the resource based on the hostname pre-resolution data and the access policy, redirecting the user to a backend server for accessing the resource, redirect the user to the DNS cache for generating the response, and so forth. The computer hardware can include circuitry that is fabricated for a single purpose and/or configurable circuitry that is programmable, such as a field-programmable gate array (FPGA). As one example, the pre-resolver logic 240 can include a multi-threaded real-time software routine that interfaces to the access policy data 260 module and the hostname pre-resolution data 160 module. For example, the pre-resolver logic 240 can include a software daemon executed by a processor of the intermediary server computer 120. A daemon is a software routine that runs as a background process. A real-time software routine is a routine that processes information with a time constraint. Real-time systems can schedule tasks (e.g., threads) based on time constraints and can preempt or interrupt tasks based on a priority of completing the task. Each thread of the pre-resolver logic 240 can communicate with the access policy data 260 module and the hostname pre-resolution data 160 module using a different session.

The pre-resolver logic 240 can process DNS resolution requests (such as from the webtop 180) even before the user has logged on to the webtop 180 and determine how to service the request. For example, a DNS resolution request can be serviced using locally cached data (such as from the hostname pre-resolution data stored in the DNS resolver cache 170) and/or data that is obtained from another DNS server (such as to the DNS server 140) in a hierarchy of DNS servers. The pre-resolver logic 240 can process DNS responses (such as from the DNS server 140) and can cache the records of the DNS responses in the DNS resolver cache 170. The pre-resolver logic 240 can initiate requests for multiple DNS servers based on their availability and health status. For example, the pre-resolver logic 240 can configure multiple hostnames against each resource in the webtop 180 in a multi-cloud environment. Further the pre-resolver logic 240 can identify the best backend server for accessing the resource based on health status data of each of the backend servers associated with the multiple hostnames. The pre-resolver logic 240 can also configure and re-render the webtop 180 based on health status of the available applications. The health status monitoring comprises sending periodic diagnostic signals and receiving corresponding status responses to and from an application respectively, to identify availability of the application. The application can be a resource on the webtop 180 or a backend server, for example. The pre-resolver logic 240, the user data 250, the access policy data 260 and the hostname pre-resolution data 160 can be used to provide quick resolution of DNS queries.

The user data 250 comprises storage of data about user activity, usage pattern data for one or more resources accessed by the user (such as the user associated with the client device 110), user profile data such as which user group a user belongs to, for example.

The access policy data 260 comprises data related to one or more access policies associated with the webtop 180 configured for a user. An access policy comprises a set of rules associated with accessing of webtop 180 by the user. The set of rules include such as rules for identifying a resource type for a resource configured on the webtop 180 for the user. The resource type can be a favorite resource or a non-favorite resource. The resource type can be determined based on usage pattern data associated with the resource or by monitoring user activity, for example. The access policy data 260 includes, among other things, a start point, one or more actions, one or more branches of execution, macros, or macro calls, and one or more endings. The access policy associated with a resource allows a user of the webtop 180 desirous of configuring the resource to perform one or tasks, including but not limited to: collecting client information for the client device 110 accessing the webtop 180, using authentication to verify the user of the client device 110, retrieve the user's rights and attributes, and grant access to resources. Each access policy may have configurable properties based on the type of the access policy. The type of the access policy may be such as either a per-session policy or a per-request policy. The per-session request access policy verifies endpoint security and authenticates the user before starting an access session. The per-request access policy verifies endpoint security and authenticates a user before allowing access to a sensitive resource after the session is established. Additionally, the access policy can include a configurable property determining whether to add an entry for a resource in the DNS resolver cache 170 based on the type of the resource or not.

Figure 3:
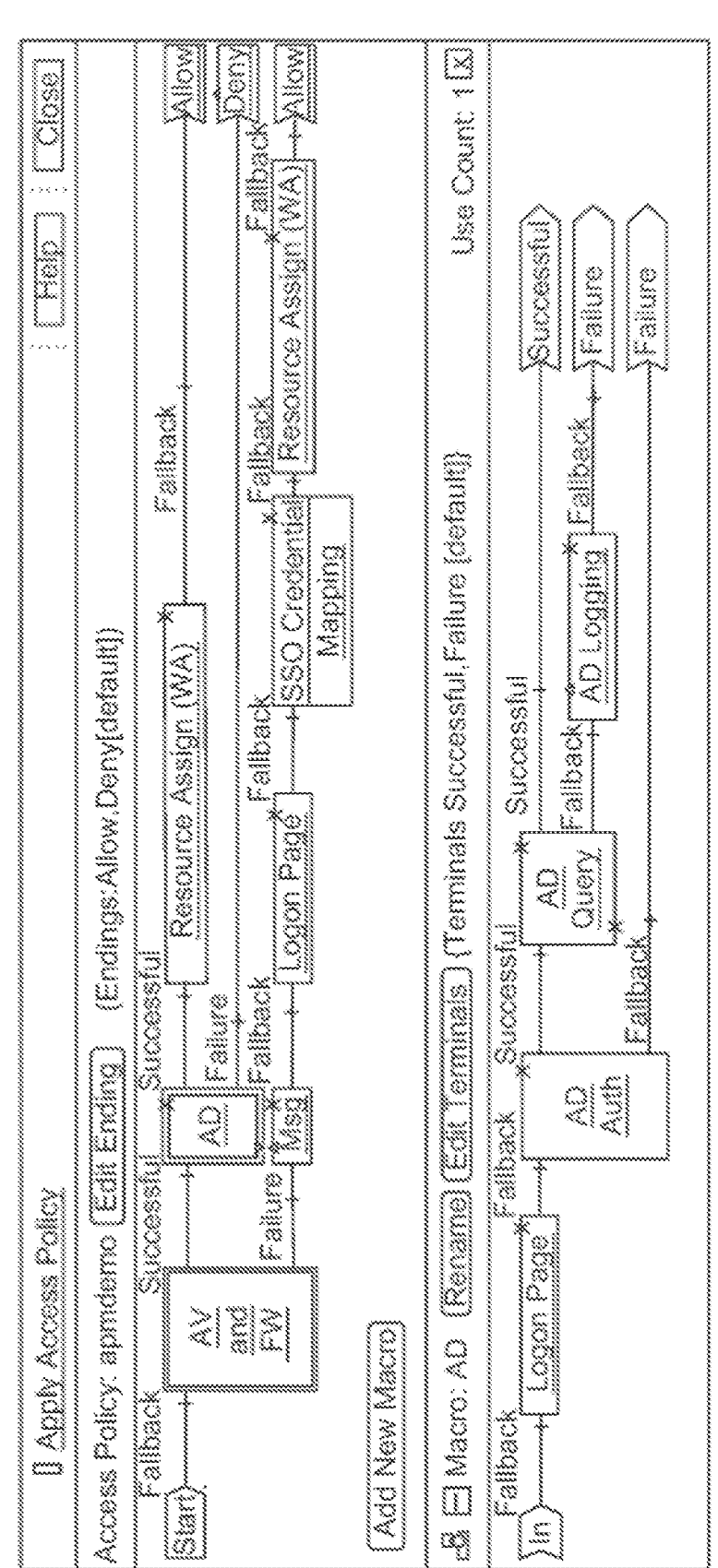
FIG. 3 is an example of a graphical user interface (GUI) associated with an access policy manager for configuring one or more access policies for the webtop.

The configurable properties of the access policies may be configured using a configuration file and/or a user interface, such as the visual editor Graphical User Interface (GUI) as illustrated in FIG. 3.

FIG. 3 is an example of a GUI 300 associated with an access policy manager for configuring one or more access policies for the webtop 180. The GUI 300 illustrates a visual editor that enables configuring one or more properties for the access policy. For example, the GUI 300 illustrates options for adding new endings and macros for the access policy.

Similarly, the GUI 300 may be used to provide options for configuring adding or not adding of entries in DNS resolver cache based on resource type for a webtop. The GUI 300 may be accessed by a user, such as an administrator, for configuring one or more access policies. The administrator may be given privileges to configure one or more resources as favorite resources for any user, based on their experience and discretion. Apart from this, the administrator may access the GUI 300 associated with the access policy manager, such as access policy manager 150 illustrated in FIG. 1, which may be configured to make use of usage pattern data and its associated analytics and statistics to make the decision of a favorite or non-favorite resource while configuring any access policy for any user of the webtop 180. A webtop, such as the webtop 180, comprises a GUI 400 that displays an example of a plurality of resources, as illustrated in FIG. 4, and for each resource an access policy can be configured using a configuration file and/or an editor such as the visual editor associated with the GUI 300.

Figure 4:
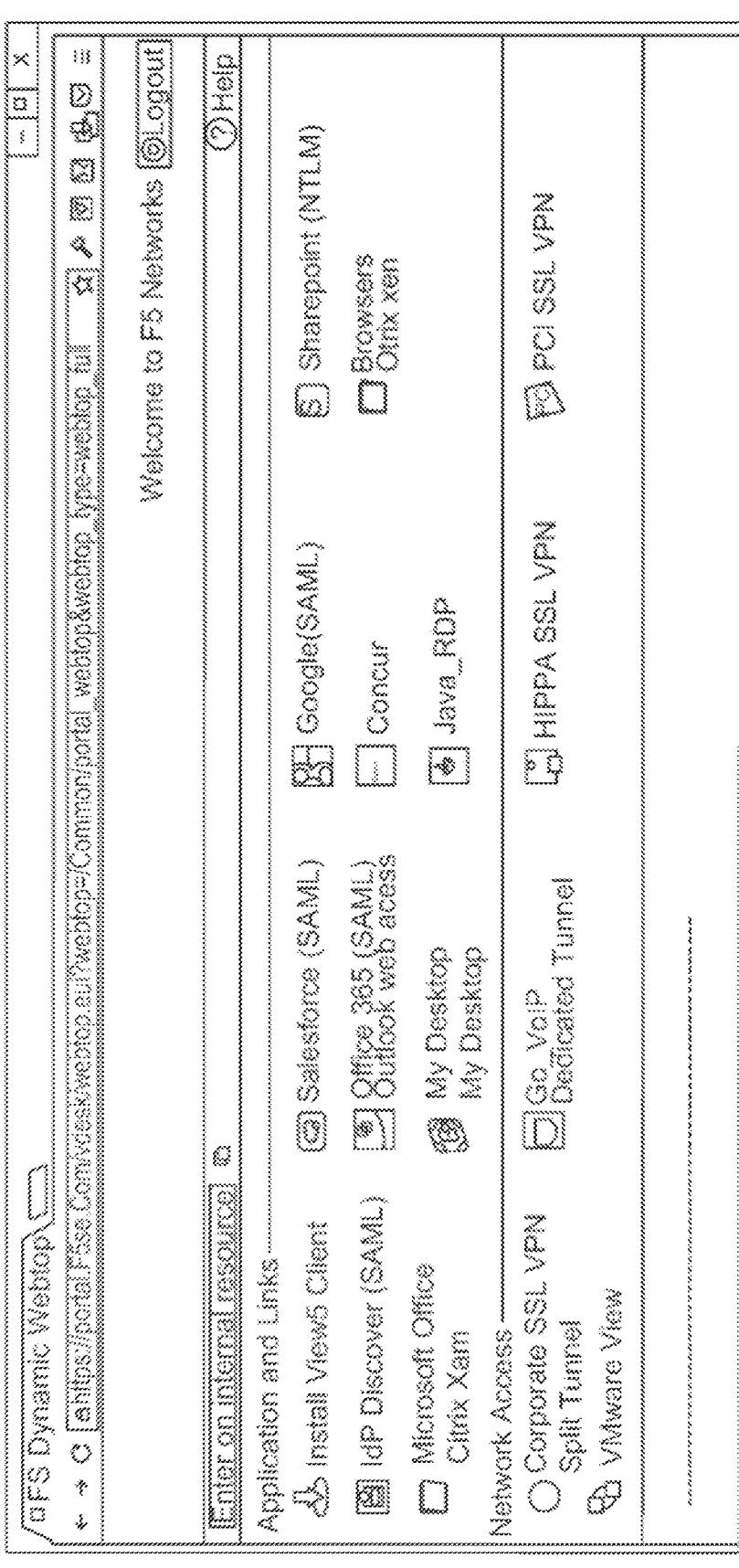
FIG. 4 is an example of a GUI associated with the webtop displaying one or more resources.

The GUI 400 in FIG. 4 illustrates the plurality of resources, such as the resources 180*a*, 180*b* . . . 180*n*, associated with the webtop 180 shown in FIG. 1. Each given resource may correspond to one or more hostnames, and each hostname is associated with a corresponding address of a server, to which a user desirous of accessing the given resource is redirected to, in order to access the services provided by the given resource. For example, the resource Outlook web access displayed on the GUI 400 may be associated with a hostname such as: owa.siterequest.com. The hostname may be associated with a (backend) server address, such as 10.133.20.55. The resource Outlook web access may have multiple hostnames and multiple backend servers and their corresponding addresses associated with it, in some examples.

When the user logs in to the webtop 180, and before they click on any given resource (to request access for the given resource), the hostname pre-resolution data 160 for the resource can be fetched and stored in the DNS resolver cache 170. For example, in the case of the resource Outlook web access discussed above, the hostname owa.siterequest-.com and the corresponding address 10.133.20.55, are stored as an entry in the DNS resolver cache 170. As soon as the user clicks on the resource Outlook web access, they will be redirected to the backend server with address 10.133.20.55 without any delay. Thus, any delay that would have been caused due to waiting for the resource access request to be resolved, by waiting for a response from the DNS server 140, can be avoided.

The resource, such as Outlook web access discussed above, may be a resource that the user always accesses when logged on to the webtop 180. This may be identified based on monitoring user activity and determining their usage pattern data. The usage pattern data may include resource access pattern data such as frequency of access, timestamp of access, type of device for access, location or geographical region associated with the access request, user group of the user initiating the resource access request, and other pattern data, for example. The usage pattern data may then be used to identify if the resource is a favorite resource or non-favorite resource. Based on the type of the resource, an access policy can be updated for the resource, and it may be configured to have hostname pre-resolution data updated for the resource in the DNS resolver cache 170. The update may include editing, refreshing, or creating an entry in the hostname pre-resolution data 160 stored in the DNS cache 160. Based on the update, the resource access request can be served by the intermediary server apparatus 200, as described in the exemplary methods illustrated in FIG. 5 and FIG. 6.

Example Methods of Managing Resource Access Requests

Figure 5:
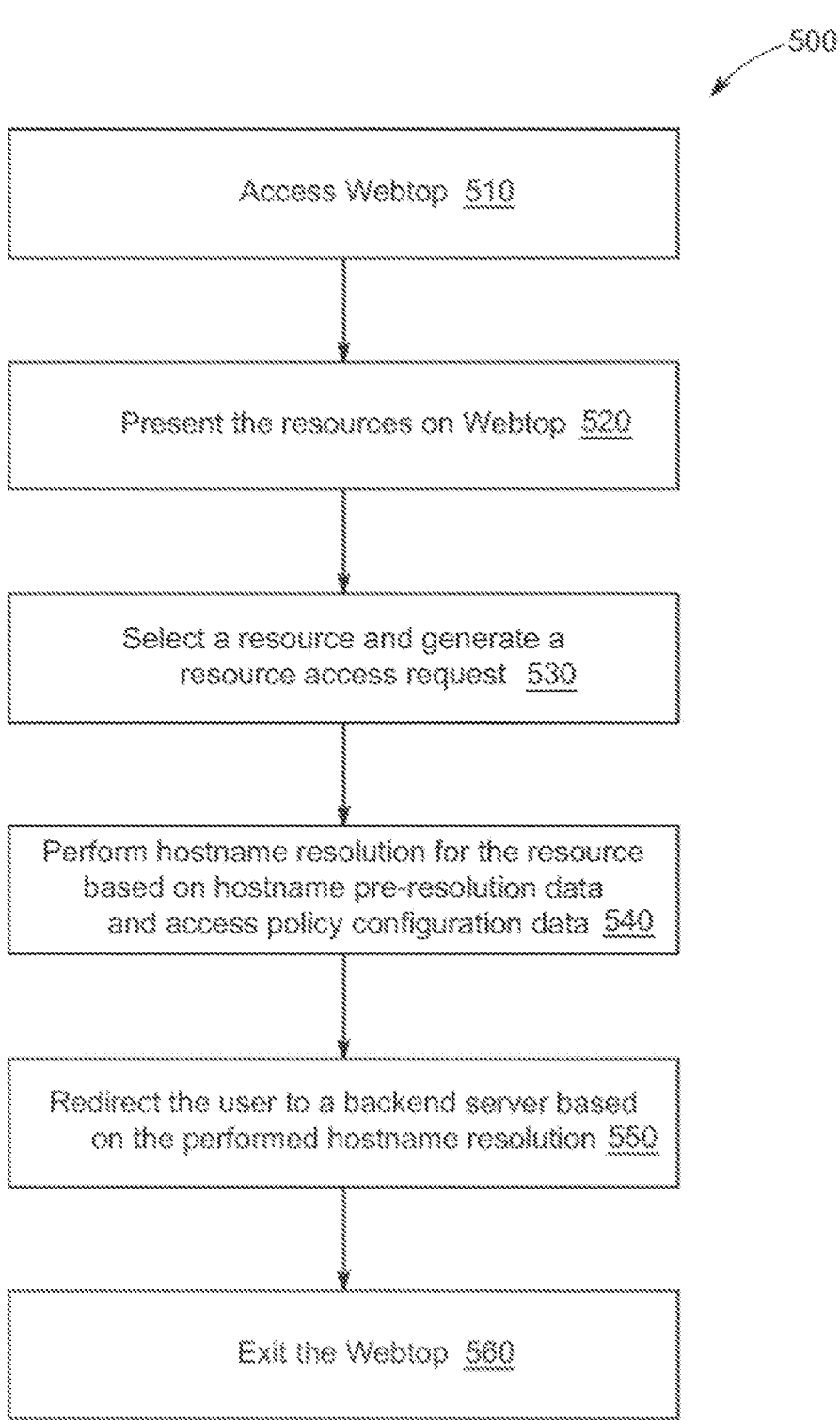
FIG. 5 is a flowchart of an example method for managing resource access requests from the webtop.

FIG. 5 is a flowchart of an example method 500 for managing resource access requests from the webtop 180. Specifically, the method 500 illustrates how resource access requests for accessing a given resource from the webtop 180 configured for a client device 110 can be serviced. The method 500 can be implemented using the architecture 100, such as described above in reference to the example shown in FIGS. 1-4. As one example, computer-executable instructions for carrying out the method 500 can be stored in computer-readable memory (e.g., the memory 210) and the instructions can be executed by one or more processor(s) (e.g., the processor 230) to perform the method 500.

At 510, the user accesses the webtop. For example, the user uses their client device 110 and opens an application or a web browser on their client device 110 and sends a request for accessing the webtop 180 to the intermediary server apparatus 120. The intermediary server apparatus 120 receives the request for accessing the webtop 180 with the user of the client device 110, and grants access by displaying the landing page comprising a login web page for the webtop 180 on the user's client device 110. The user access the login web page associated with the webtop 180 through application or the web browser on their client device 110. The user can be an employee of an enterprise hosting a network (such as the communication network 130) associated with the webtop 180. The login web page can be provided by the access policy manager 150 module on the intermediary server apparatus 120 and is rendered via the web browser of the client device 110 or via the application execution on the client device 110. The user may then login to the webtop 180 using their predefined login credentials. The user may then be authenticated based on their login credentials. If the authentication is successful, the method proceeds to 520.

At 520, the method 500 is configured to present a plurality of resources on the webtop 180. For example, based on the user's login credentials and their associated user data, such as the user data 250 and access policy data 260, stored in the intermediary server apparatus 120, the available resources for the user are presented on the webtop 180. The user data 250 may include such as user profile data, data identifying user group that the user belongs to (for example, manager, IT administrator, sales executive, etc.), user device type data, user location data, temporal data, for example. The access policy data 260 can include data about one or more access policies that determine enterprise web applications and resources allowed for access by the user, based on the set of rules defined for the user in the one or more access policies. The one or more access policies are configured by an administrator, such as by using the GUI 300 illustrated in FIG. 3, at the time of creation of the webtop 180 for the user, and are updated periodically based on user requirements, resource updates, security requirements, user activity monitoring, and the like. The one or more access policies are applied to user data 250 and access policy data 260 and are then applied to a resource end point or a given resource configured on the webtop 180. The resources configured with access polices are then presented to the user on the webtop 180, such as in the form of the GUI 400 illustrated in FIG. 4. In an example, the hostname pre-resolution process begins as soon as a resource is identified as a favorite resource of the user. Any resource may be identified as the favorite resource for the user based on either of an administrator defining the resource as the favorite resource, or the resource being identified as the user's favorite resource based on the user's resource usage pattern data. Based on any of the two scenarios described herein, the hostname pre-resolution process begins as has been discussed earlier and comprises identifying one or more hostnames associated with each given resource, fetching hostname pre-resolution data 160 for the given resource from the DNS server 140, and storing the hostname pre-resolution data 160 in the form of an entry in the DNS resolver cache 170.

At 530, the user selects a given resource from the plurality of resources, such as by clicking on the given resource, and generates a resource access request. The request is received by the intermediary server apparatus 120, which parses the request. Further, the pre-resolver logic 240 executes to service the request. As part of the execution of the pre-resolver logic 240, the hostname pre-resolution data 160 and the access policy 260 are retrieved for the requested resource.

At 540, hostname resolution for the accessed resource is performed based on the retrieved hostname pre-resolution data 160, the access policy 260 and application of the pre-resolver logic 240. Specifically, the pre-resolver logic 240 carries out operations to provide a response for the resource access request by redirecting the resource access request to the DNS resolver cache 170. There, a look-up is performed in the DNS resolver cache 170 to determine the hostname pre-resolution data 160 for the requested resource, using the hostname associated with the resource. For example, a resource 180*a* may be associated with a hostname "www.myrequestedresouce.com". The hostname pre-resolution data 160 is checked entry by entry to see of the hostname "www.myrequestedresouce.com" exists in the DNS resolver cache 170. When the entry corresponding to the hostname "www.myrequestedresouce.com" is found, the corresponding address of at least one backend server is identified. For example, a backend server address 1.2.3.4 may associated with a backend server that hosts the application provided by the hostname "www.myrequestedresouce.com". Based on the determined hostname pre-resolution data and backend server address, a response for the resource access request directing the resource access request to the identified server is generated and transmitted to the server serving the resource.

Thus, at 550, the user is redirected to the identified server address (such as 1.2.3.4 in this case). The user performs the desires operations using the given resource. Further, the user may access multiple resources during their single login session on the webtop 180. Each resource access request corresponding to each resource is resolved in the manner described above. Once the user has performed all desired operations on the webtop 180, the user may decide to logout of the webtop 180 and end the session.

At 560, the user exits the webtop 180 and ends the session of access of the webtop 180. Apart from the activities performed by the method 500, there are other activities that are also performed periodically for hostname resolution process described above. These activities may be performed by a daemon, which is a background process, or may be performed by active initiation by the administrator responsible for managing the webtop 180. Some of these activities are described in FIG. 6.

Figure 6:
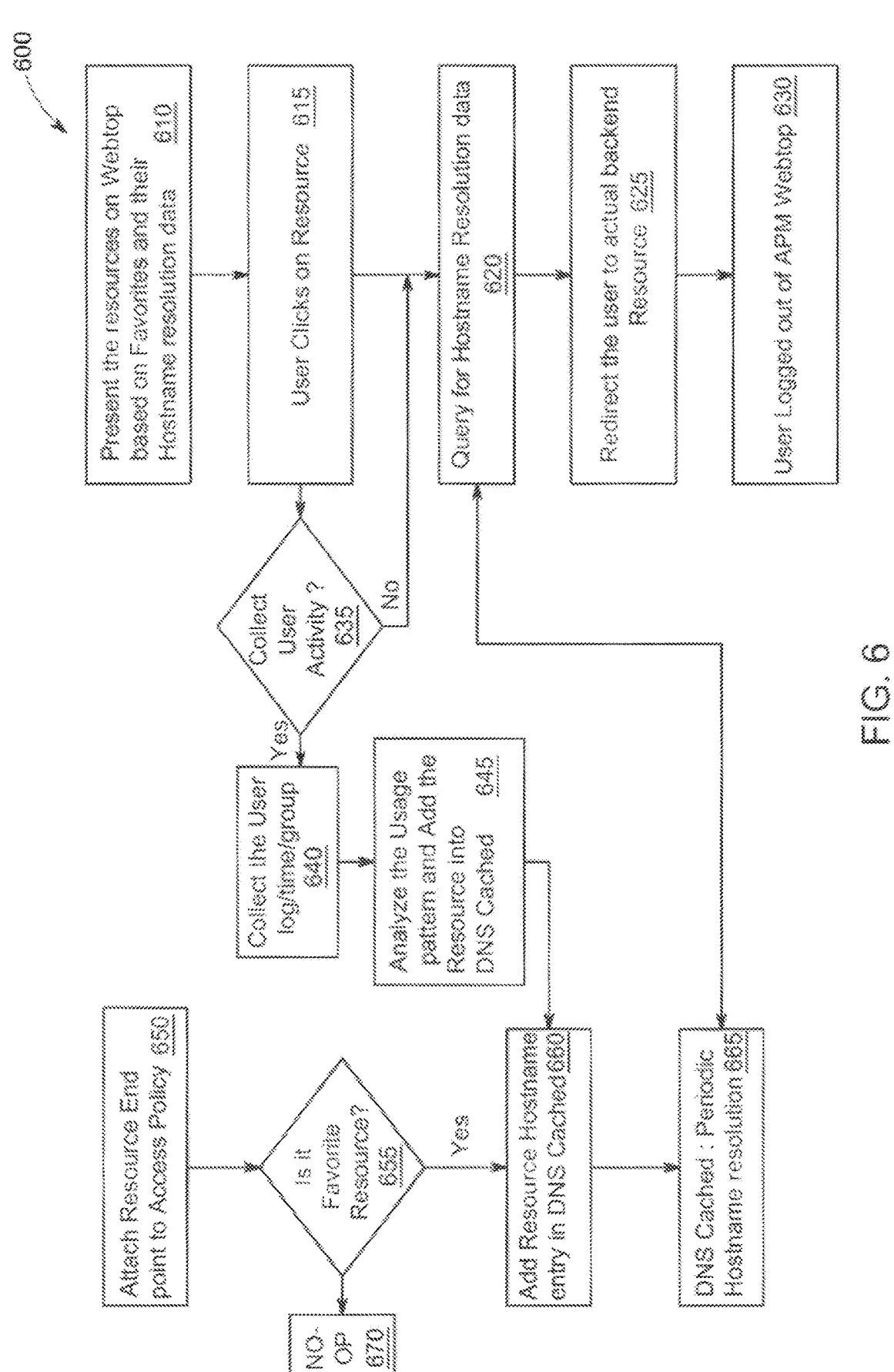
FIG. 6 is a flowchart of an example method for managing resource access requests and configuring access policies for the webtop.

FIG. 6 is a flowchart of an example method 600 for managing resource access requests and configuring access policies for the webtop 180. Specifically, the method 600 illustrates how resource access requests for accessing a resource from the webtop 180 configured for a client device 110 can be serviced. The method 600 can be implemented using the architecture 100, such as described above in reference to FIGS. 1-5. As one example, computer-executable instructions for carrying out the method 600 can be stored in computer-readable memory (e.g., the memory 210) and the instructions can be executed by one or more processor(s) (e.g., the processor 230) to perform the method 600.

The method 600 includes two parallel flows of processing. One flow is represented by operations in steps 610-630. The second flow is described in steps 635-670. For the purpose of describing for the current example, the two flows will be discussed separately. However, the operations 610-670 can all execute in various combinations, without deviating from the scope of the present disclosure.

The method 600 including flow of operation 610-630 begins at 610. At 610, the plurality of resources are presented on the webtop 180 based on a resource type of a given resource and their hostname resolution data 610. The type of the given resource is one of favorite or non-favorite. The classification of the resource as favorite or non-favorite is done based on monitoring of user activity and usage pattern data, which will be discussed in operations 635670. In some examples, the classification of the resource as favorite or non-favorite is done by the administrator, or a user authorized to manage access policy data for all the resources associated with the webtop, based on the administrator's discretion. The administrator may use their past experience of resource classification, organizational policy based mandatory resource list, user group or user role-based resource assignment requirements and the like to classify the resource as favorite or non-favorite. Returning to 610, the plurality of resources may be presented to the user on the webtop 180 based on whether they are favorite or not and based on hostname resolution data. For example, the favorite resources may be displayed first, followed by the non-favorite resources. Similarly, if the hostname resolution data for a given resource already exists, they may be prioritized in presentation of resources on the webtop 180.

At 615, the user clicks on a given resource of interest to select the resource. Based on user's selection of the resource, both operations 620 and 635 occur. Operation 635 will be discussed later for discussion in second flow of operations.

At 620, a query or a request for hostname resolution data is generated. The query for hostname resolution data is directed to the DNS resolver cache 170 for resolution, based on hostname pre-resolution data 160 and access policy data 260. The DNS resolver cache 170 is periodically updated at 665, so that any queries for hostname resolution are always served by most up-to-date data. The DNS resolver cache 170 resolves the query and returns a response comprising the address of a backend server address (also referred to as a backend resource).

Further, at 625, the user is redirected to the backend resource provided in the response from the DNS resolver cache 170 to request for accessing the given resource from the server. Once the user has accessed this or any other resources, at 630, the user is logged out of their webtop 180. The sequence of steps 610-630 of the method 600 is similar in operation to steps 520-560 discussed in the method 500 illustrated in FIG. 5. However, the method 600 also describes the second flow of operations comprising sequence of steps 635-670, which will be described in detail.

At 635, the method 600 includes determining whether to collect user activity data for monitoring user activity data for the user associated with the webtop 180. If the user activity can be monitored (such as based on permissions set for the user), the method 600 proceeds to 640. However, if the user activity data cannot be collected, the method returns to operation 620.

At 640, the user activity is monitored and user activity data and usage pattern data for different resources of the webtop 180 is collected. The collected data may include such as user activity logs, user group, temporal data, user device data, user group data, and the like. The usage pattern data includes pattern of usage of resources, frequency of access for different resources, time of access for different resources, priority of access of different resources, historical access pattern for a resource, statistical parameters associated with resource access, for example.

After collection, at 645, the user activity data and the usage pattern data are analyzed to determine resource access pattern data for the selected resource (or one by one for all resources attached to user's webtop 180). The analysis may be done by correlating the usage pattern data with the resource and the user data. For example, a user who is a sales manager accesses a resource "Salesforce" on the webtop 180 (associated with GUI 400) multiple times during each day and uses it for long sessions. Thus, based on the frequency of access and usage pattern, the resource "Salesforce" may be identified as a favorite resource for the user. On the other hand, the same user may access another resource such as a network access utility like "VMware view" very rarely, like once in a week or fortnight or only occasionally. Accordingly, the resource "VMware view" may be considered a non-favorite resource for the user. Further, the determination that the resource is favorite or non-favorite may be used to define a rule in the access policy for the resource. According to the result of the analysis of the user activity data and the usage pattern data at 645, an entry may be made in DNS resolver cache 170, at 660, corresponding to hostname pre-resolution data for a resource for which analysis is done.

At 650, when an access policy is attached to the resource, at 655 it is determined whether the resource is a favorite resource or not. If yes, and that is also validated based on analysis of usage pattern data (at 645) for the resource and the user, at 660, an entry for the resource is added in the DNS resolver cache 170, as already described previously. However, if the resource is a non-favorite resource, then the method 600 is configured to not perform any operation, at 670.

Finally, at 665, the hostname pre-resolution data in the DNS resolver cache 170 is updated based on at least one of adding of an entry at 660 or receiving of a query for a resource at 620. Alternately, the data in the DNS resolver cache 170 is also updated based on periodic health status monitoring of the one or more backend servers. For example, during periodic health status monitoring it is identified that the backend server 5.6.7.8 associated with hostname "www.mynewresource.com" for a resource 180*b* is down. Then an alternate or secondary backend server may be identified, such as by querying the DNS server 140 or by selecting a second entry for the resource 180*b* which already stores the hostname and address for the secondary backend server. Then the DNS resolver cache 170 is updated to remove the entry of the server 5.6.7.8 and update the primary backend server in the response as the secondary server.

Example Computing Environments

Figure 7:
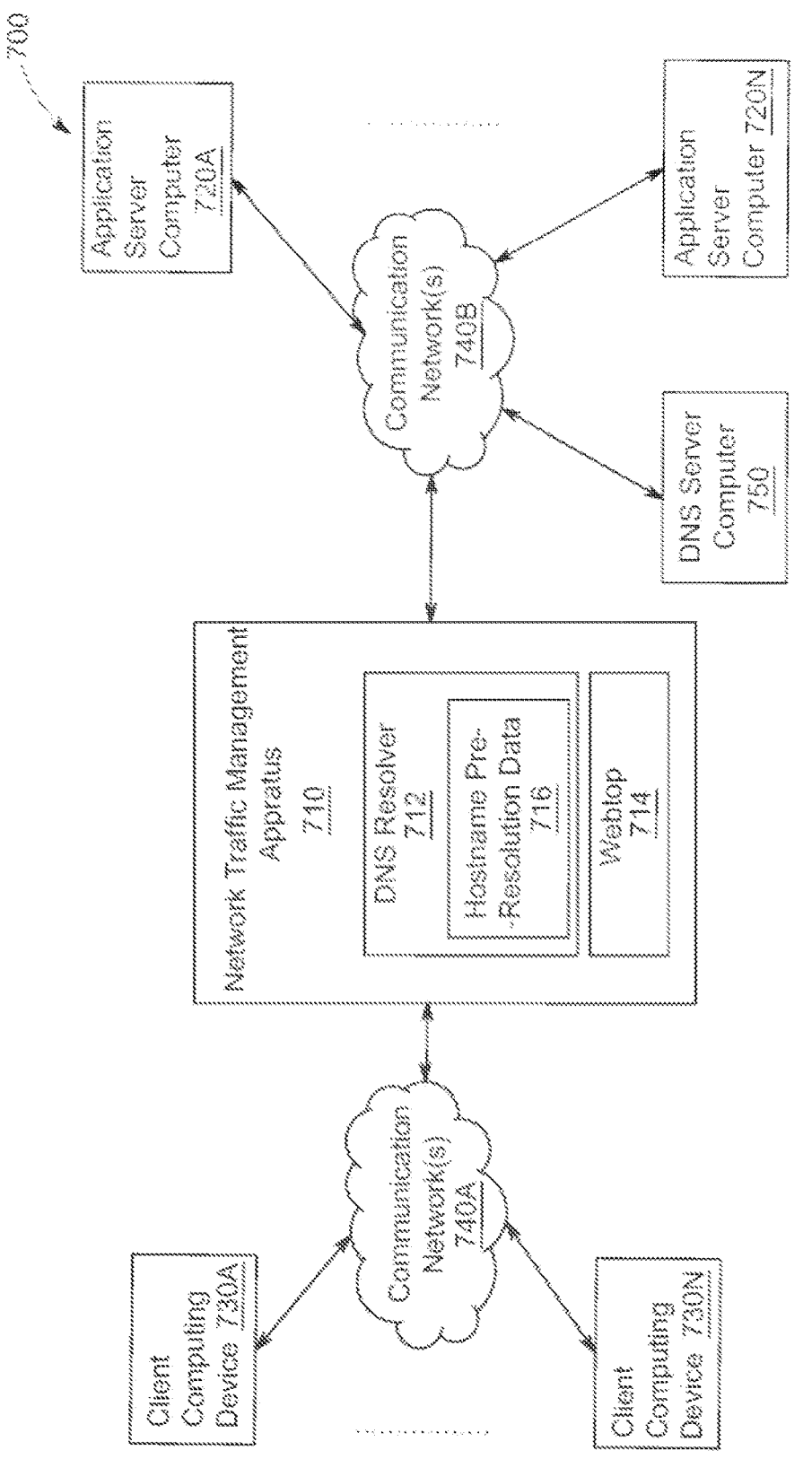
FIG. 7 is a block diagram of an example client-server architecture including logic for managing resource access requests from the webtop.

FIG. 7 illustrates an example client-server architecture 700 (also referred to as a network traffic management system) that incorporates a network traffic management apparatus 710. The client-server architecture 700 includes a network traffic management apparatus 710 which can be envisaged as the intermediary server apparatus 120, that is coupled to one or more server computers (such as application server computers 720A-N and DNS server computer 750) and one or more client devices (such as client computing devices 730A-N) via one or more communication networks (such as the communication networks 740A and 740B). The server computers 720A-N and 750 can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N and 750 so that the network traffic management apparatus 710 can intercept all network traffic flowing between the different networks 740A and 740B. In other examples, the network traffic management apparatus 710, the server computers 720A-N and 750, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
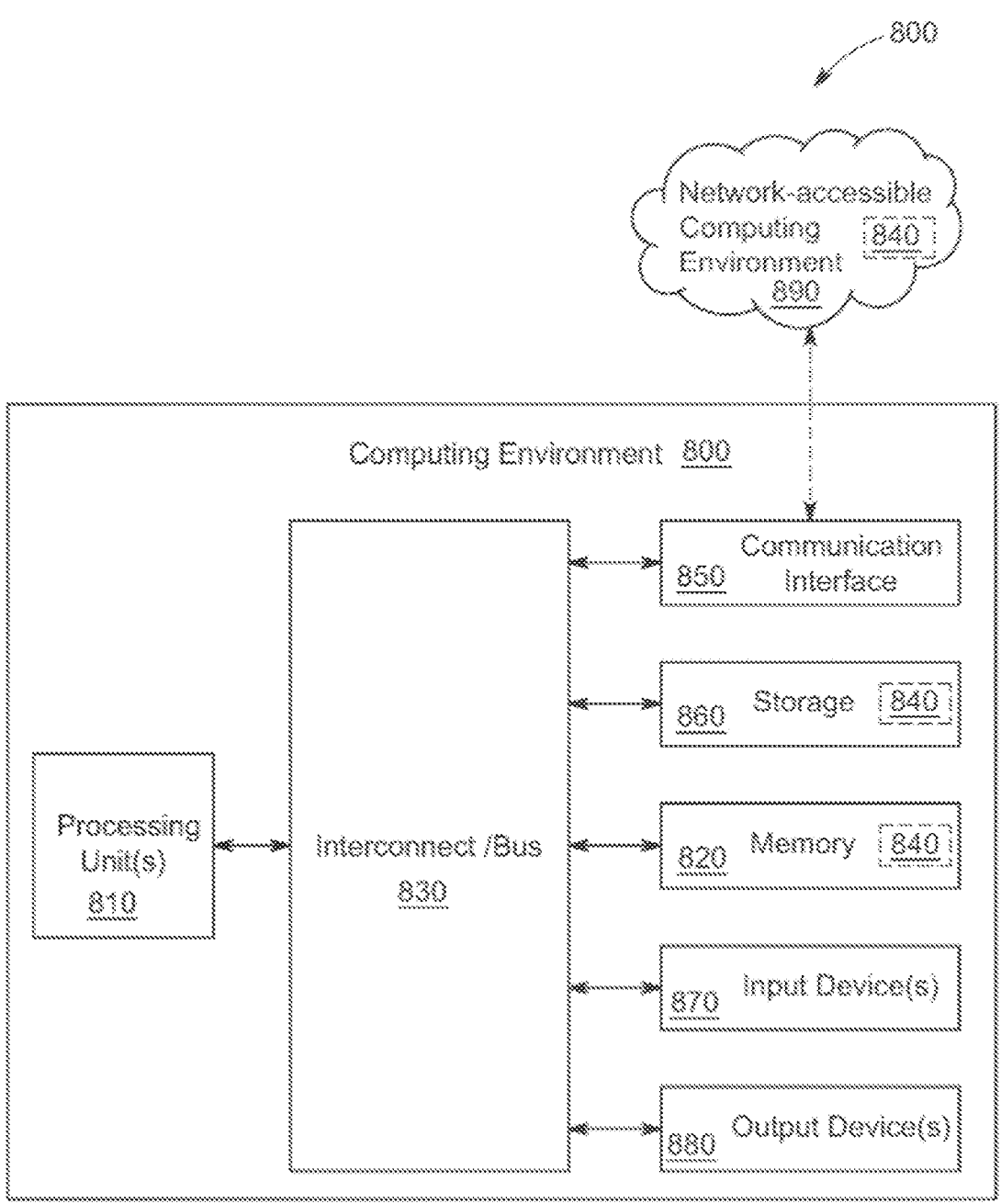
FIG. 8 is a block diagram of an example computing environment, such as can be used for a server computer.

Generally, the server computers 720A-N and 750, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N and 750 via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N and 750 can include any type of computing device that can exchange network data. For example, the server computers 720A-N and 750 can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks. The server computer 750 can execute a DNS server application.

While the server computers 720A-N and 750 are illustrated as single devices, one or more actions of each of the server computers 720A-N and 750 may be distributed across one or more distinct network computing devices that together comprise one or more of the server computers 720A-N and 750. Moreover, the server computers 720A-N and 750 are not limited to a particular configuration. Thus, the server computers 720A-N and 750 may contain network computing devices that operate using a coordinated approach, whereby one of the network computing devices of the server computers 720A-N and 750 operate to manage or otherwise coordinate operations of the other network computing devices. Each of the server computers 720A-N and 750 can operate as a networked computing device within a cluster architecture, a computing device within a peer-to-peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N and 750 can operate within the network traffic management apparatus 710 itself rather than as a stand-alone server device communicating with the network traffic management apparatus 710 via communication network 740B. In this example, the one or more of the server computers 720A-N and 750 operate within the memory of the network traffic management apparatus 710.

The network traffic management apparatus 710 can include any type of computing device that can be used for managing network traffic and for pre-resolution of resource access requests from a webtop. The network traffic management apparatus 710 can perform several functions, including providing network security, managing resource access from webtop, configuring access policies, access control, load balancing network traffic across the server computers 720A-N, and/or accelerating network traffic associated with an application hosted by one or more of the server computers 720A-N, for example. Each of the functions can be performed by a service. The services can be incorporated into workloads that are executed by the network traffic management apparatus 710 For example, the network traffic management apparatus 710 can include a workload that is used to perform proxy and other services on behalf of the server 720A-N and to manage traffic between the clients 730A-N and the servers 720A-N. Additionally, the network traffic management apparatus 710 can include other network devices such as one or more routers or switches, for example.

The network traffic management apparatus 710 can include DNS resolver logic 712 and hostname pre-resolution data 716 as described above with reference to FIGS. 1-6. For example, the DNS resolver logic 712 can implement the pre-resolver logic 240 and intercept DNS requests from the client devices 730, via a webtop 714, and redirect them to the DNS resolver cache 170 and can generate responses from the DNS resolver cache 170 and send them to the client devices 730. The intercepted DNS requests can be serviced using hostname pre-resolution data 716 (and access policy data 260). When there is no data matching the request stored in the DNS resolver cache 170, the DNS resolver logic 712 can send DNS requests for the data to the DNS server computer 750 (which is like the DNS server 140 illustrated in FIG. 1). When the DNS server computer 750 responds with the requested data, the data can be cached in the hostname pre-resolution data 716, which can implement the DNS resolver cache 170 functions and return responses to the requesting client device 730.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N, or client computing devices 730A-N, for example, may be configured to operate as virtual instances on the same physical machine. In other words, one or more of the network traffic management apparatus 710, server computers 720A-N, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for managing name server data.

The computing environment 800 includes at least one processing unit 810 and computer-readable memory 820, which are coupled together by an interconnect/bus 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radiofrequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, Wi-Fi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for resolving hostnames for webtop resource access and managing name server data) can be in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed examples can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present, or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together and does not exclude the presence of intermediate elements between the coupled items. The term "and/or" means any one item or combination of items in the phrase.

The recited order of processing elements or sequences, or the use of numbers, letters, or other designations, therefore, is not intended to limit the claimed processes to any order. Although the operations of some of the disclosed methods are described in a sequential order for convenient presentation, this manner of description encompasses rearrangement, unless a particular ordering is required by specific claim language set forth below. For example, operations described sequentially may in some cases be rearranged or performed concurrently. Moreover, for the sake of simplicity, the attached figures may not show all the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, the disclosed technology is not limited to any specific computer language or program. For instance, the disclosed technology can be implemented by software written in C, C++, Java, or any other suitable programming language. Likewise, the disclosed technology is not limited to any computer or type of hardware. Certain details of suitable computers and hardware are well-known and need not be set forth in detail in this disclosure.

Having thus described many possible examples to which the principles of the invention may be applied, it will be recognized by those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:

receiving a request for accessing a webtop associated with a user, the webtop providing an interface for the user to access a plurality of resources;

determining usage pattern data of the user for the webtop by monitoring an activity of the user, wherein the usage pattern data comprises resource access pattern data for the plurality of resources accessible from the webtop, the resource access pattern data indicating a pattern of access of the plurality of resources by the user;

determining, based on the usage pattern data and an access policy, hostname pre-resolution data for a given resource from the plurality of resources accessible from the webtop before the given resource is requested for access by the user; and generating a response for a resource access request corresponding to the given resource, based on the determined hostname pre-resolution data and the access policy, wherein the response to the resource access request comprises an address of at least one corresponding server for redirecting the user to access the given resource requested for access.

2. The method of claim 1, wherein the resource access request is a Domain Name System (DNS) request for accessing the given resource.

3. The method of claim 2, wherein the one or more network traffic management apparatuses comprise a DNS cache configured to store the hostname pre-resolution data as one or more entries, wherein each of the entries comprises:

a hostname associated with at least one of the plurality of resources, one or more addresses associated with one or more corresponding servers for the hostname associated with at least one of the plurality of resources, or a combination thereof: for redirecting the user to access the at least one of the plurality of resources.

4. The method of claim 3, wherein the access policy comprises at least a set of rules associated with the webtop associated with the user, wherein the set of rules are configured to at least identify a resource type for the given resource based on the usage pattern data, wherein the resource type is at least one of a favorite resource or a non-favorite resource.

5. The method of claim 4, further comprising:

determining the resource type for the given resource; and storing the one or more entries corresponding to the hostname associated with the given resource in the DNS cache, when the resource type is the favorite resource.

6. The method of claim 3, wherein the generating the response for the resource access request corresponding to the given resource based on the determined hostname pre-resolution data and the access policy further comprises:

redirecting the user to the DNS cache;

determining the hostname pre-resolution data associated with the given resource by performing a look-up of the hostname associated with the given resource in the DNS cache; and determining the address of the at least one corresponding server for redirecting the user to access the given resource based on the performed look-up.

7. The method of claim 6, wherein the address of the at least one corresponding server is determined based on a periodic health status monitoring operation performed for each of the one or more servers.

8. The method of claim 1, further comprising:

updating the usage pattern data, the hostname pre-resolution data and the access policy for the user based on the monitored activity of the user.

9. A system comprising one or more network traffic management modules, networking modules, or server modules, memory comprising programmed instructions stored thereon, and one or more processors configured to be capable of executing the stored programmed instructions to:

receive a request for accessing a webtop associated with a user, the webtop providing an interface for the user to access a plurality of resources;

determine usage pattern data of the user for the webtop by monitoring an activity of the user, wherein the usage pattern data comprises resource access pattern data for the plurality of resources accessible from the webtop, the resource access pattern data indicating a pattern of access of the plurality of resources by the user;

determine, based on the usage pattern data and an access policy, hostname pre-resolution data for a given resource from the plurality of resources accessible from the webtop before the given resource is requested for access by the user; and generate a response for a resource access request corresponding to the given resource, based on the determined hostname pre-resolution data and the access policy, wherein the response for the resource access request comprises an address of at least one corresponding server for redirecting the user to access the given resource requested for access.

10. The system of claim 9, wherein the resource access request is a Domain Name System (DNS) request for accessing the given resource.

11. The system of claim 10, wherein the network traffic management module comprises a DNS cache configured to store the hostname pre-resolution data as one or more entries, wherein each of the entries comprises:

a hostname associated with at least one of the plurality of resources, one or more addresses associated with one or more corresponding servers for the hostname associated with at least one of the plurality of resources, or a combination thereof: for redirecting the user to access the requested at least one of the plurality of resources.

12. The system of claim 11, wherein the access policy comprises at least a set of rules associated with the webtop associated with the user, wherein the set of rules are configured to at least identify a resource type for the given resource based on the usage pattern data, wherein the resource type is at least one of a favorite resource or a non-favorite resource.

13. The system of claim 12, wherein the one or more processors is further configured to:

determine the resource type for the given resource; and store the one or more entries corresponding to the hostname associated with the given resource in the DNS cache, when the resource type is the favorite resource.

14. The system of claim 11, wherein for the generate the response for the resource access request, the one or more processors are further configured to:

redirect the user to the DNS cache;

determine the hostname pre-resolution data associated with the given resource by performing a look-up of the hostname associated with the given resource in the DNS cache; and determine the address of the at least one corresponding server for redirecting the user to access the given resource in the DNS cache based on the performed look-up.

15. The system of claim 9, wherein the one or more processors are further configured to:

update the usage pattern data, the hostname pre-resolution data and the access policy for the user based on the monitored activity of the user.

16. A non-transitory computer readable medium having stored thereon instructions comprising executable code that, when executed by one or more processors, causes the one or more processors to:

receive a request for accessing a webtop associated with a user, the webtop providing an interface for the user to access a plurality of resources;

determine usage pattern data of the user for the webtop by monitoring an activity of the user, wherein the usage pattern data comprises resource access pattern data for the plurality of resources accessible from the webtop, the resource access pattern data indicating a pattern of access of the plurality of resources by the user;

determine, based on the usage pattern data and an access policy, hostname pre-resolution data for a given resource from the plurality of resources accessible from the webtop before the given resource is requested for access by the user; and generate a response for a resource access request corresponding to the given resource, based on the determined hostname pre-resolution data and the access policy, wherein the response to the resource access request comprises an address of at least one corresponding server for redirecting the user to access given resource requested for access.

17. The non-transitory computer readable medium of claim 16, wherein the resource access request is a Domain Name System (DNS) request for accessing the given resource.

18. The non-transitory computer readable medium of claim 17, wherein the hostname pre-resolution data comprises one or more entries stored in a DNS cache corresponding to a hostname associated with at least one of the plurality of resources, one or more addresses associated with one or more corresponding servers for the hostname associated with at least one of the plurality of resources, or a combination thereof: for redirecting the user to access the requested at least one of the plurality of resources.

19. The non-transitory computer readable medium of claim 18, wherein the access policy comprises at least a set of rules associated with the webtop associated with the user, wherein the set of rules are configured to at least identify a resource type for the given resource based on the usage pattern data, wherein the resource type is at least one of a favorite resource or a non-favorite resource.

20. A network traffic management apparatus, comprising memory comprising programmed instructions stored thereon and one or more processors configured to be capable of executing the stored programmed instructions to:

receive a request for accessing a webtop associated with a user, the webtop providing an interface for the user to access a plurality of resources;

determine usage pattern data of the user for the webtop by monitoring an activity of the user, wherein the usage pattern data comprises resource access pattern data for the plurality of resources accessible from the webtop, the resource access pattern data indicating a pattern of access of the plurality of resources by the user;

determine, based on the usage pattern data and an access policy, hostname pre-resolution data for a given resource from the plurality of resources accessible from the webtop before the given resource is requested for access by the user; and generate a response for a resource access request corresponding to the given resource, based on the determined hostname pre-resolution data and the access policy, wherein the response for the resource access request comprises an address of at least one corresponding server for redirecting the user to access the given resource requested for access.

\* \* \* \* \*